No. 648,153. Patented Apr. 24, 1900.
J. P. SERVE.
MEANS FOR LUBRICATING ENGINE CYLINDERS, &c.
(Application filed Apr. 26, 1898.)

(No Model.)

Witnesses
Inventor
J. P. Serve
By P. T. Dodge

THE NORRIS PETERS CO., PHOTO-LITHO., WASHINGTON, D. C.

UNITED STATES PATENT OFFICE.

JEAN PIERRE SERVE, OF CALUIRE, FRANCE.

MEANS FOR LUBRICATING ENGINE-CYLINDERS, &c.

SPECIFICATION forming part of Letters Patent No. 648,153, dated April 24, 1900.

Application filed April 26, 1898. Serial No. 678,893. (No model.)

*To all whom it may concern:*

Be it known that I, JEAN PIERRE SERVE, manufacturer, a citizen of the Republic of France, residing at Caluire et Cuire, Rhône, in the Republic of France, have invented certain new and useful Improvements in Means for Lubricating Engine-Cylinders and the Like, (for which I have made application for Letters Patent in France, dated March 28, 1898, No. 264,185,) of which the following is a specification.

My invention relates to engine-cylinders, and has for its object to produce a device of this character in which the use of a solid lubricant is rendered feasible.

To this end the invention consists of a cylinder, a piston movable therein, means for conveying a lubricant between the friction-surfaces of said parts, providing one of said parts with grooves formed in its end to receive the surplus lubricant, and means for discharging the surplus lubricant.

The invention further consists in the details of construction hereinafter described.

Figure 1:
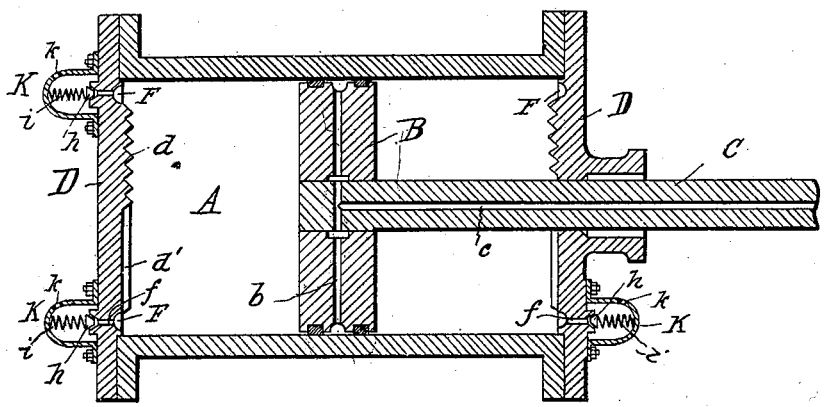
Figure 2:
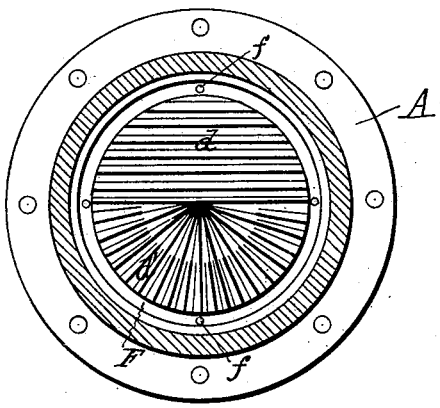
Figure 3:
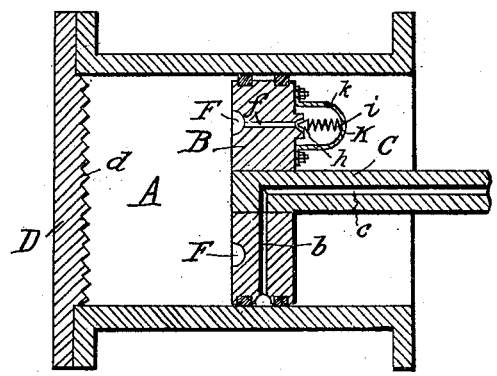

In the accompanying drawings, Figure 1 is a central longitudinal section through a cylinder and piston having my invention embodied therein. Fig. 2 is a cross-section on the line $x\ x$ of Fig. 1, showing the cylinder end in elevation. Fig. 3 is a central longitudinal section through a cylinder and piston, showing a modified form of the device.

Referring to the drawings, A indicates an engine-cylinder, which may be of the usual or any desired construction except as hereinafter pointed out, and B the piston, movable therein in the customary manner.

C is the piston-rod, provided in the present instance with a central longitudinal passage $c$, which communicates and serves, in connection with a lateral passage $b$ through the piston, to convey a lubricant to and discharge it between the friction-surfaces of the said cylinder and piston.

D D are the cylinder ends, which are, in accordance with my invention, provided with suitable grooves or channels $d\ d'$ for the reception of the surplus lubricant which will be forced into them by the action of the piston. These grooves may be formed laterally of the cylinder ends, as shown at $d$, or radially, as illustrated at $d'$.

F is a comparatively-deep wide annular groove formed around the cylinder end outside of and common to all the grooves $d$ $d'$, which communicate with and discharge into it.

$f\ f$ are suitable openings or perforations through the ends of the cylinder, through which the groove F communicates with and discharges the surplus lubricant to the exterior of the cylinder. The openings $f\ f$ are normally closed by means of suitable valves $h$, seated thereover and held in place by springs $i$, which bear at their outer ends against the end walls of cup-shaped casings K, which are suitably attached to the ends of the cylinder, externally of the same, over the openings $f$ and which serve the functions of inclosing and protecting the valves and receiving the surplus lubricant which is discharged from the cylinder.

$k$ are small air-escape openings formed through the casings K and admit the escape of air therefrom and also its being seen when the casings are filled with lubricant, that they may be removed and emptied.

The operation of the device is as follows: The lubricant enters the cylinder through the passages in the piston-rod and piston, and as it accumulates the surplus is backed up and forced by the movement of the piston into the grooves $d\ d'$, from which it flows into the groove F and thence is discharged through the opening $f$ to the exterior of the cylinder, where it is received and retained in the chambers K until removed, as circumstances require.

In the modification shown in Fig. 3 the piston is provided with groove F, openings $f$, communicating with its exterior, valves $h$, springs $i$, and casings K, all constructed and operating precisely as heretofore described, except that in this instance after the surplus lubricant has been backed up into the grooves $d$ by the action of the piston the pressure of the piston against the same on its instroke forces said lubricant into the groove F, and thence outward through passages $f$, as above explained. While I have not shown in this modification the grooves $d\ d'$, formed in the end of the piston, it is to be understood that such a construction may be adopted and would in such case operate as perfectly and perform its function as effectively as when they are formed in the cylinder ends.

Heretofore the use of solid lubricants in engine-cylinders, although far superior in action to liquid lubricants, has been rendered practically impossible and even dangerous, owing to this lubricant accumulating in the cylinder being backed up against the cylinder or piston ends by the motion of the latter, where it formed, in effect, a solid wall which continually increased in thickness until it shortened the piston-stroke to such an extent that the shock incurred thereby rendered liable the weakening or actual knocking out of the cylinder end. Now it will be seen that by my construction I overcome these disadvantages and dangers and render the employment of solid lubricants in this connection perfectly safe and feasible, and in attaining this end I believe myself to be the first to provide either the cylinder or piston with grooves formed in its end to receive the surplus lubricant, and in this the essence of the invention broadly resides, and any departure therefrom involving merely mechanical skill will fall within the limits of my invention.

Having thus described my invention, what I claim is—

1. The combination with an engine-cylinder, of a piston movable therein, means for conveying a lubricant between the friction-surfaces of said parts, one of said parts being grooved in its end to receive the surplus lubricant, and means for discharging said surplus lubricant; substantially as described.

2. The combination with an engine-cylinder, of a piston movable therein, means for conveying a lubricant between the friction-surfaces of said parts, said cylinder having grooves formed in its end to receive the surplus lubricant, and means for discharging said surplus lubricant; substantially as described.

3. The combination with an engine-cylinder, of a piston movable therein, means for conveying a lubricant between the friction-surfaces of said parts, one of said parts having formed in its end grooves to receive the surplus lubricant, and an annular groove with which the first-named grooves communicate, said annular groove provided with openings communicating with the exterior of the cylinder; substantially as described.

4. The combination with an engine-cylinder, of a piston movable therein, means for conveying a lubricant between the friction-surfaces of said parts, one of said parts having formed in its end grooves to receive the surplus lubricant and an annular groove with which the first-named grooves communicate, said annular groove provided with openings communicating with the exterior of the cylinder, valves normally closing said openings, and casings seated over said valves and adapted to receive the lubricant as discharged; substantially as described.

In witness whereof I have hereunto signed my name, this 6th day of April, 1898, in the presence of two subscribing witnesses.

JEAN PIERRE SERVE.

Witnesses:
 JACQUES CONDOMY,
 LÉON MARTY.